United States Patent
Cao et al.

(10) Patent No.: US 10,779,341 B2
(45) Date of Patent: Sep. 15, 2020

(54) SYSTEM AND METHOD FOR INTER-CELL COORDINATION FOR A DEVICE-TO-DEVICE COMMUNICATION RESOURCE ALLOCATION

(71) Applicant: Futurewei Technologies, Inc., Plano, TX (US)

(72) Inventors: Zhenzhen Cao, Beijing (CN); Jie Ma, Beijing (CN); Mazin Al-Shalash, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/612,017

(22) Filed: Feb. 2, 2015

(65) Prior Publication Data

US 2015/0223204 A1 Aug. 6, 2015

Related U.S. Application Data (60) Provisional application No. 61/934,611, filed on Jan. 31, 2014.

(51) Int. Cl.
*H04W 76/14* (2018.01)
*H04W 4/06* (2009.01)
*H04W 72/12* (2009.01)
*H04W 72/04* (2009.01)

(52) U.S. Cl.
CPC ............ *H04W 76/14* (2018.02); *H04W 4/06* (2013.01); *H04W 72/1278* (2013.01); *H04W 72/0426* (2013.01)

(58) Field of Classification Search
None
See application file for complete search history.

(56) References Cited

U.S. PATENT DOCUMENTS

| | | | |
|---|---|---|---|
| 8,787,240 B2 * | 7/2014 | Liu | H04B 7/2606 370/315 |
| 9,648,651 B2 * | 5/2017 | Edge | H04W 76/023 |
| 2007/0159969 A1 | 7/2007 | Das et al. | |
| 2007/0211662 A1 * | 9/2007 | Hyon | H04L 1/0025 370/329 |
| 2008/0049749 A1 * | 2/2008 | Xiao | H04L 1/1692 370/390 |
| 2009/0040928 A1 | 2/2009 | Wang et al. | |

(Continued)

FOREIGN PATENT DOCUMENTS

WO    WO 2013/074462 A1    5/2013

*Primary Examiner* — Noel R Beharry
*Assistant Examiner* — Rodrick Mak
(74) *Attorney, Agent, or Firm* — Slater Matsil, LLP (57) ABSTRACT

Various disclosed embodiments include methods and apparatus for inter-cell coordination for a device-to-device communication resource allocation. A method includes allocating, at a first base station, a device-to-device (D2D) communication resource from a pool of communication resources to a first electronic device controlled by the first base station, wherein the first electronic device is within a D2D communication group. The method also includes, in response to a second electronic device within the D2D communication group being controlled by a second base station, transmitting, by the first base station, information corresponding to the D2D communication resource allocation to the second base station.

6 Claims, 8 Drawing Sheets

(56) References Cited

U.S. PATENT DOCUMENTS

| | | | |
|---|---|---|---|
| 2012/0093098 A1* | 4/2012 | Charbit | H04W 72/04 370/329 |
| 2012/0106517 A1* | 5/2012 | Charbit | H04W 72/04 370/336 |
| 2012/0243431 A1* | 9/2012 | Chen | H04W 72/0406 370/252 |
| 2012/0252474 A1 | 10/2012 | Tiirola et al. | |
| 2012/0309441 A1* | 12/2012 | Eriksson | H04L 5/0094 455/509 |
| 2013/0029675 A1 | 1/2013 | Kwon et al. | |
| 2013/0059583 A1* | 3/2013 | Van Phan | H04W 72/04 455/435.1 |
| 2013/0148552 A1 | 6/2013 | Zhang et al. | |
| 2014/0003302 A1 | 1/2014 | Han et al. | |
| 2014/0094183 A1* | 4/2014 | Gao | H04W 72/048 455/450 |
| 2014/0153390 A1* | 6/2014 | Ishii | H04W 52/242 370/230 |
| 2014/0162668 A1* | 6/2014 | Na | H04W 72/121 455/450 |
| 2014/0192659 A1* | 7/2014 | Tian | H04W 72/0453 370/252 |
| 2014/0315562 A1* | 10/2014 | Lim | H04W 8/005 455/450 |
| 2014/0376444 A1* | 12/2014 | Park | H04W 72/005 370/312 |
| 2015/0146637 A1* | 5/2015 | Morita | H04W 72/1252 370/329 |
| 2015/0334757 A1* | 11/2015 | Seo | H04W 24/08 370/329 |
| 2016/0044486 A1* | 2/2016 | Pais | H04W 8/005 370/252 |
| 2016/0127910 A1* | 5/2016 | Yilmaz | H04W 72/082 370/329 |
| 2016/0198508 A1* | 7/2016 | Lee | H04W 72/02 370/329 |
| 2016/0285601 A1* | 9/2016 | Kim | H04B 7/026 |
| 2016/0323870 A1* | 11/2016 | Wei | H04L 5/0032 |
| 2017/0214607 A1* | 7/2017 | Kim | H04W 28/04 |

* cited by examiner

SYSTEM AND METHOD FOR INTER-CELL COORDINATION FOR A DEVICE-TO-DEVICE COMMUNICATION RESOURCE ALLOCATION

CROSS-REFERENCE TO RELATED APPLICATIONS

The present application claims priority to U.S. provisional Application No. 61/934,611 filed on Jan. 31, 2014, which is incorporated herein by reference.

TECHNICAL FIELD

The present disclosure relates generally to device-to-device communication.

BACKGROUND

Direct communication is one of the main features of device-to-device (D2D) services. To facilitate D2D communication, both a transmitting device and a receiving device must have a common understanding of the radio resources to be used. Several methods could be used to allocate resources for D2D communication. For example, a controlling node, such as a wireless controller (e.g., a base station, a NodeB, an evolved NodeB (eNodeB), a base transceiver station (BTS), or an access point) may allocate radio resources to a transmitting device, and inform receiving devices of this allocation. Typically both transmitting and receiving devices would get information about the D2D resource allocation from respective control messages transmitted over an air interface protocol, such as LTE.

In the case of a communication system that includes many wireless controllers, the transmitting device may be controlled by one wireless controller while one or more receiving devices may be controlled by another wireless controller. In this scenario, it may be difficult for the controller that assigned the radio resources to the transmitting device to also communicate this allocation to all potential receiving devices for the D2D communication.

If a potential receiving device is controlled by the same wireless controller as the transmitting device, then the controller can directly communicate the allocated D2D resources to this receiving device. However, if the potential receiving device is controlled by another wireless controller, then it is unlikely that the first wireless controller can communicate directly with such a receiving device.

SUMMARY

According to one embodiment, there is provided a method for resource allocation for a device-to-device communication. The method includes allocating, at a first base station, a device-to-device (D2D) communication resource from a pool of communication resources to a first electronic device controlled by the first base station, wherein the first electronic device is within a D2D communication group. The method also includes, in response to a second electronic device within the D2D communication group being controlled by a second base station, transmitting, by the first base station, information corresponding to the D2D communication resource allocation to the second base station.

In another embodiment, there is provided system for resource allocation for a device-to-device communication. The system includes a first base station configured to allocate a D2D communication resource from a pool of communication resources to a first electronic device controlled by the first base station, wherein the first electronic device is within a D2D communication group, and in response to a second electronic device within the D2D communication group being controlled by a second base station, transmit information corresponding to the D2D communication resource allocation to the second base station.

In another embodiment, there is provided a method for resource allocation for a device-to-device communication. The method includes determining, at an electronic device within a device-to-device (D2D) communication group, whether a reception pool of communication resources for the D2D communication group has changed. In response to determining that the reception pool of communication resources for the D2D communication group has changed, modifying the reception pool of communication resources for the D2D communication group to produce a modified reception pool for the D2D communication group, and receiving D2D data transmissions in accordance with the modified reception pool for the D2D communication group. In response to determining that the reception pool of communication resources for the D2D communication group has not changed, receiving D2D data transmissions in accordance with the reception pool for the D2D communication group.

Other technical features may be readily apparent to one skilled in the art from the following figures, descriptions, and claims.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 8, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

The present disclosure describes a method, apparatus, and associated signaling for inter-cell coordination for device-to-device (D2D) communication resources between different wireless controllers (e.g., base stations), and the devices served by these controllers.

The present disclosure includes a system that comprises a first controller assigning D2D communication resources from a pool of resources to a first transmitting device. The D2D transmit resource pool may be specific to a set of devices engaged in a group communication session (e.g., a group of public safety users). If any member of this communication group is controlled by another controller (e.g., base station), then the controller assigning the D2D communication resources will inform the other controller(s) about the transmit resource pool that it has assigned or reserved for members of this communication group. Each wireless controller may provide periodic updates of assigned D2D radio resources to other controllers. Alternatively, such updates may be triggered by certain events, such as an increase in the size of the transmit resource pool, decrease in the size of the transmit resource pool, or a change in the assigned resources from the pool exceeding an absolute or relative threshold.

In response to receiving a resource allocation update for a specific communication group, the controller of a potential receiving D2D device can update receiving devices that are associated with that communication group. The controller may communicate a receiving resource pool to the receiving devices that comprise the union of all transmit resources for that communication group. Transmit D2D resources may be assigned by several wireless controllers (e.g., base stations) for a communication group. In addition, wireless controllers may use information about D2D transmit resources to coordinate with other controllers, so as to minimize interference between devices served by different controllers.

Figure 1:
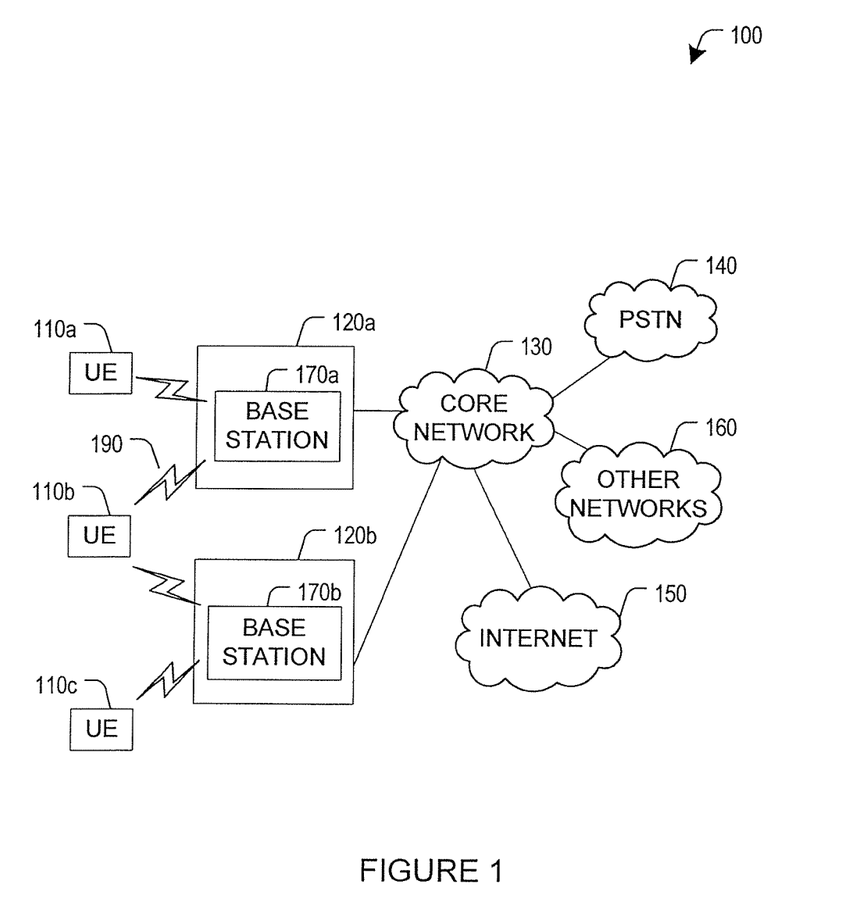
FIG. 1 illustrates a diagram of an illustrative communication system for inter-cell coordination for device-to-device communication resource allocation according to one embodiment.

FIG. 1 illustrates an example communication system 100 that can implement inter-cell coordination for a device-to-device communication resource allocation. In general, the system 100 enables multiple wireless users to transmit and receive data and other content. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The UEs 110a-110c are configured to operate and/or communicate in the system 100. For example, the UEs 110a-110c are configured to transmit and/or receive via wireless or wired communication channels. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device, all of which may include and incorporate a browser application.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described above. In particular embodiments, the base stations and UEs implement LTE, LTE-A, and/or LTE-B. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols. Instead of wireless communication (or in addition thereto), the UEs may communicate via wired communication channels to a service provider or switch (not shown), and to the internet 150.

Although FIG. 1 illustrates one example of a communication system, various changes may be made to FIG. 1. For example, the communication system 100 could include any number of UEs, base stations, networks, or other components in any suitable configuration.

Figure 2A:
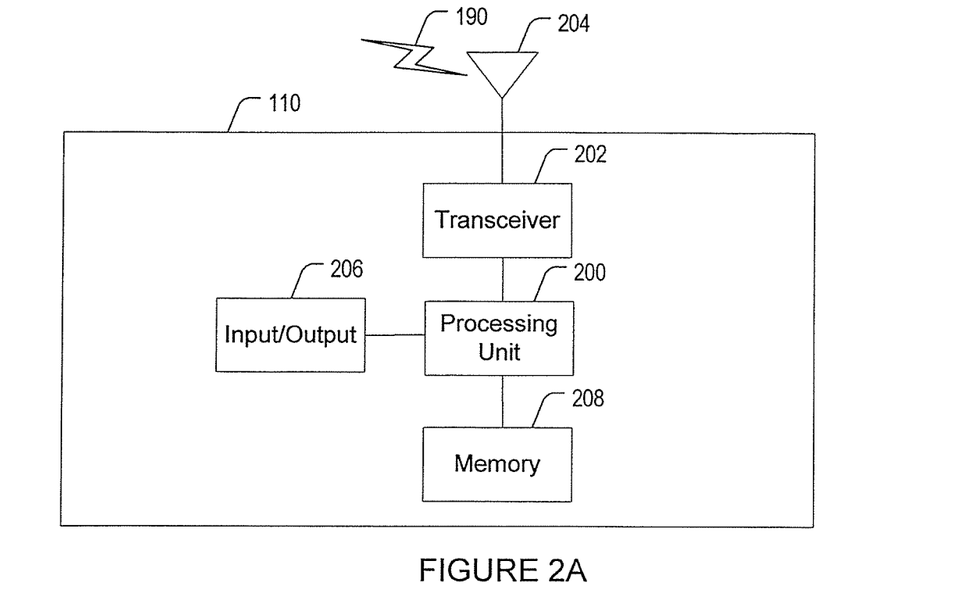
FIGS. 2A and 2B illustrate example devices that can implement inter-cell coordination for device-to-device communication resource allocation according to one embodiment.
Figure 2B:
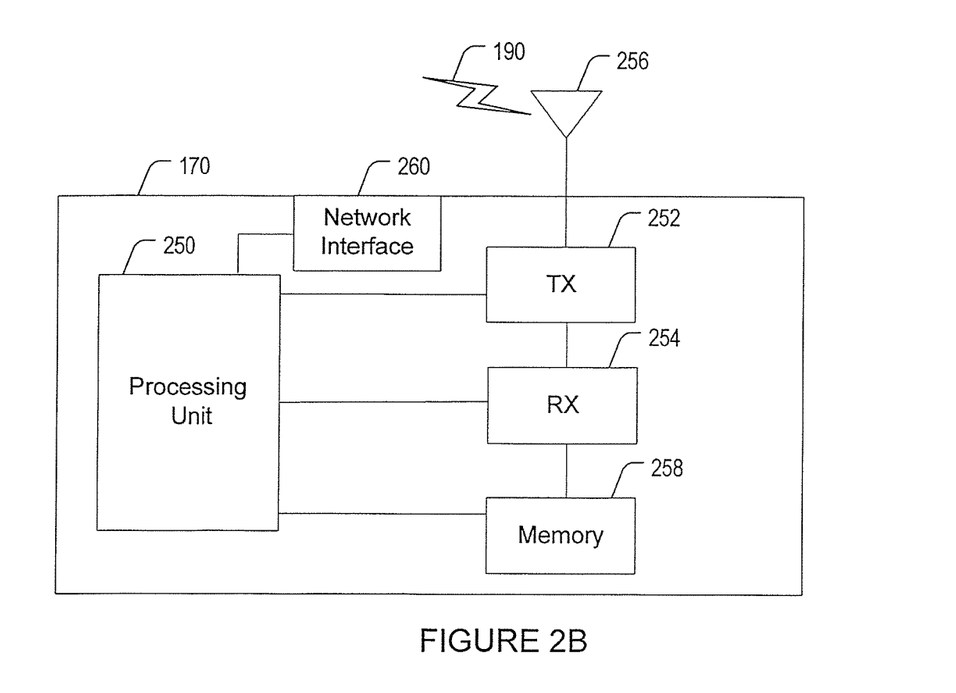

FIGS. 2A and 2B illustrate example devices that may implement the methods and teachings according to this disclosure. In particular, FIG. 2A illustrates an example UE 110, and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, one or more wired network interfaces 260, and at least one memory 258. The processing unit 250 implements various processing operations of the base station 170, such as signal coding, data processing, power control, input/output processing, or any other functionality. The processing unit 250 can also support the methods and teachings described in more detail below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base station 170 are known to those of skill in the art. As such, these details are omitted here for clarity.

Figure 3:
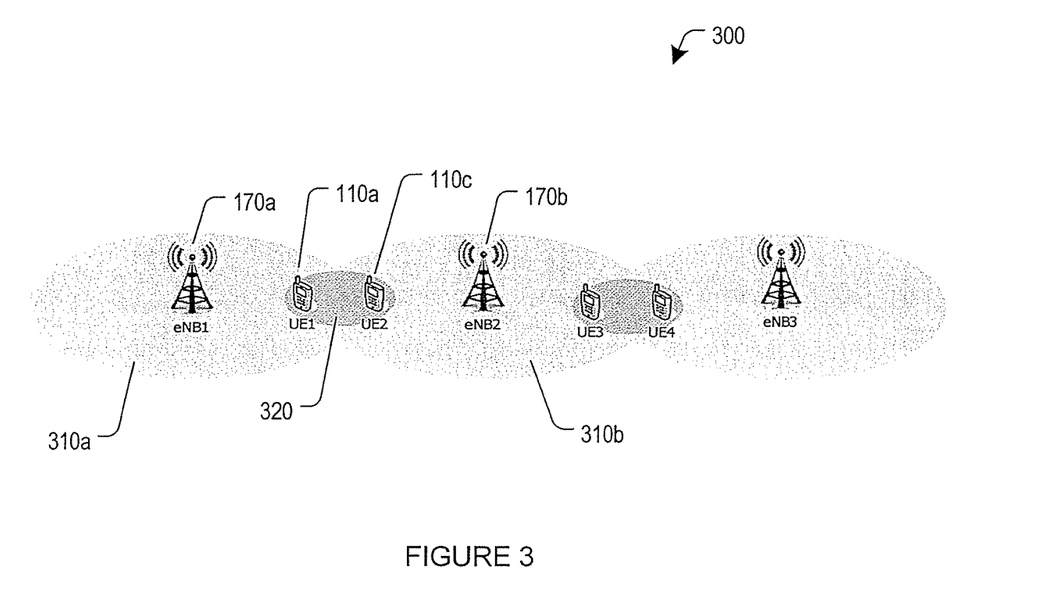
FIG. 3 illustrates a system for inter-cell coordination for device-to-device communication resource allocation according to one embodiment.

FIG. 3 illustrates a system 300 for inter-cell coordination for device-to-device communication resource allocation. The system 300 may include some or all of the components of the system 100 in FIG. 1. In this example, the system 300 includes a first UE 110*a*, a second UE 110*c*, a first base station 170*a*, and a second base station 170*b*. While certain numbers of these components or elements are shown in FIG. 3, any number of these components or elements may be included in the system 300. A first coverage area or cell 310*a* (e.g., cell-A) is associated with the base station 170*a* and a second coverage area or cell 310*b* (e.g., cell-B) is associated with the base station 170*b*. The first and second UEs 110*a*, 110*c* are configured for device-to-device (D2D) communication and are part of a D2D communication group 320. It will be appreciated that the first and second UEs 110*a*, 110*c* are shown for ease of illustration and that the D2D communication group 320 may include additional UEs.

Some members of the D2D communication group 320 could be located within the coverage of a first cell while some others are located within the coverage of a neighboring cell. For example, as illustrated in FIG. 3, the first UE 110*a* is located within the coverage of the cell-A 310*a* and the second UE 110*c* is located within the coverage of the cell-B 310*b*. The cell-A 310*a* and the cell-B 310*b* may configure their D2D transmission pools as pool-A and pool-B, respectively, and pool-A and pool-B could be different from each other. For example, the first base station 170*a* may allocate radio resources to a UE that it serves (e.g., the first UE 110*a*) to transmit D2D, and the second base station 170*b* may allocate radio resources to a UE that it serves (e.g., the second UE 110*c*) to transmit D2D. A member of the D2D communication group 320 needs to receive in both pool-A and pool-B in order to hear D2D transmissions from all of the other members in the same group.

Figure 4:
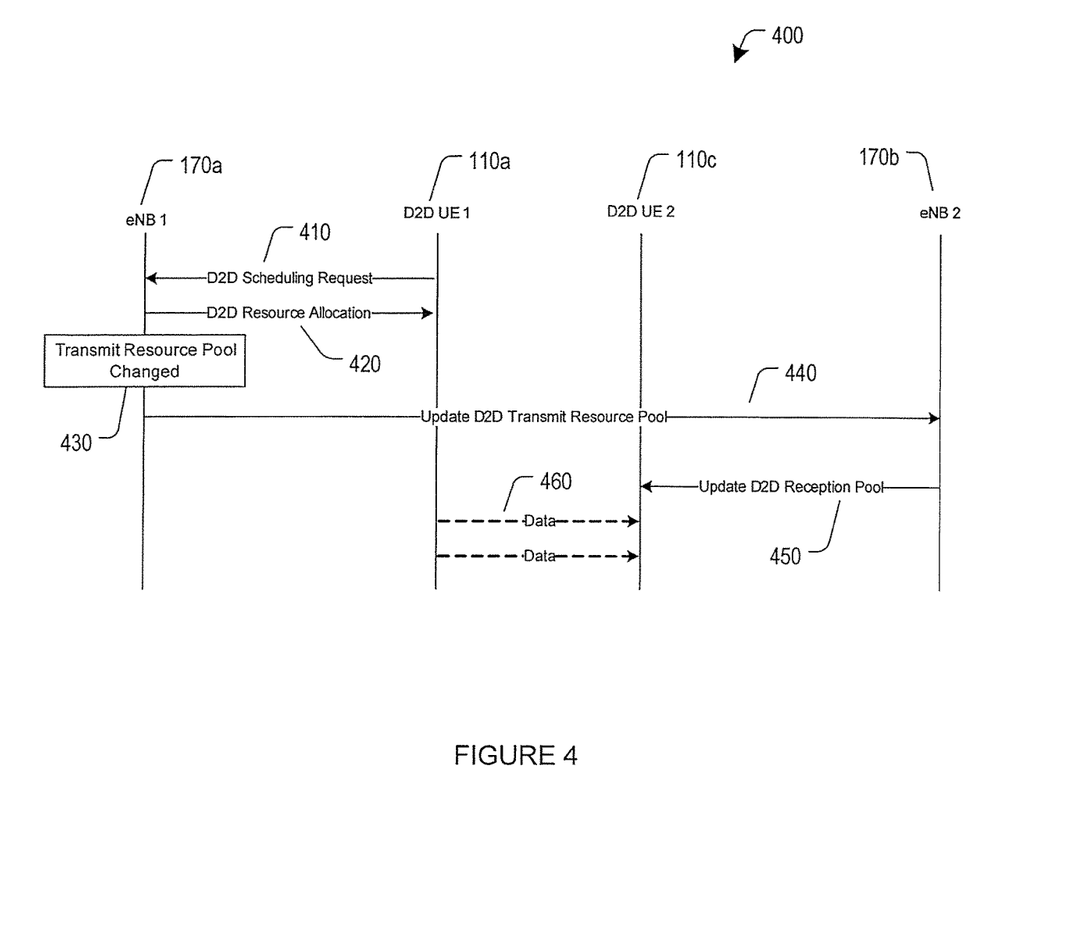
FIG. 4 illustrates a message diagram for the inter-cell coordination for device-to-device communication resource allocation of FIG. 3 according to one embodiment.

Therefore, a base station may update its neighboring cells whenever the transmission pool for a given communication group is changed or assigned new resources. This facilitates coordination of D2D transmission resources between neighboring base stations in order to control interference to D2D UEs in different cells. In addition, a serving cell can update the reception pool of UEs that it serves, which belong to a particular communication group. FIG. 4 is a simplified illustration of this procedure.

FIG. 4 illustrates a message diagram 400 for the inter-cell coordination for device-to-device communication resource allocation illustrated in FIG. 3. As illustrated, the first UE 110*a* is served by the first base station 170*a*, the second UE 110*c* is served by the second base station 170*b*, and the first and second UEs 110*a*, 110*c* are in a communication group (e.g., the D2D communication group 320) and are configured for D2D communication with each other.

The first base station 170a receives a D2D scheduling request 410 from the first UE 110a. As an example, the first base station 170a may receive the D2D scheduling request 410 from the first UE 110a during an initial attachment procedure that is performed with the first base station 170a. As another example, the first base station 170a may receive the D2D scheduling request 410 from the first UE 110a during a handover procedure that is performed with the first UE 110a. As yet another example, the first base station 170a may receive the D2D scheduling request 410 from the first UE 110a when the first UE 110a updates and changes its communications requirements. As an illustrative example, the communications requirements of the first UE 110a may include a frequency or period of transmissions from the first UE 110a, an amount of information transmitted per transmission, a bandwidth requirement of the first UE 110a, a power consumption of the first UE 110a, and the like.

In response to receipt of the D2D scheduling request 410, the first base station 170a may allocate D2D communications resources to the first UE 110a in accordance with the communications requirements. As an illustrative example, the first base station 170a may also consider the communications requirements of other UEs served by the first base station 170a, as well as other factors, such as communications system load, communications system condition, and the like, as it allocates the D2D communications resources. The allocation of the D2D communications resources may be a persistent or semi-persistent allocation to meet the on-going communications requirements of the first UE 110a.

Referring back now to FIG. 4, the first base station 170a may transmit D2D resource allocation information 420 to the first UE 110a. The D2D resource allocation information 420 may specify where and when the allocated D2D communications resources can be found by the first UE 110a. As an illustrative example, the resource allocation information may include a time, a frequency, a frame number, and the like, so that the first UE 110a knows where and when to transmit. The D2D resource allocation information 420 may be transmitted to the first UE 110a during the attachment procedure, the handover procedure, broadcast to the first UE 110a, and the like.

In response to detecting a change in a transmit resource pool at step 430, the first base station 170a sends an update D2D transmit resource pool message 440 to the second base station 170b so that the second base station 170b can inform devices that it controls that are in the D2D communications group about the updated resource pool. A transmit resource pool may include a pool of communication resources (e.g., frequency, bandwidth, power, and the like) that is specific to a group of electronic devices engaged in a D2D group communication session. For example, a change in the transmit resource pool may be detected by the first base station 170a in response to a first time allocation of resources to the first UE 110a. As another example, a change in the transmit resource pool may be detected by the first base station 170a in response to a change in the number of UEs in the D2D communication group. As yet another example, a change in the transmit resource pool may be detected by the first base station 170a in response to an addition or removal of resources (e.g., an increase or decrease in a frequency band of the uplink) and the like.

In response to receiving the update D2D transmit resource pool message 440, the second base station 170b sends an update D2D reception pool message 450 that contains the updated resource pool information to the UEs that it serves that are in the D2D communication group (e.g., the second UE 110c). Thereafter, the second UE 110c knows where to listen for transmissions 460 from the first UE 110a, and the first and second UEs 110a, 110c can communicate in a D2D fashion in accordance with the updated D2D information.

It will be appreciated that the second base station 170b may receive an updated D2D transmit resource pool message from a third base station that controls a third UE in the D2D communication group in response to the third base station detecting a change in a transmit resource pool, and that the second base station 170b may send an update D2D reception pool message 450 that contains the updated resource pool information from both the first base station 170a and the third base station to the UEs that it serves that are in the D2D communication group (e.g., the second UE 110c). The information corresponding to the changed pool of communication resources and the information corresponding to the second changed pool of communication resources is combined prior to transmission to the second electronic device (e.g., the second UE 110c).

Figure 5:
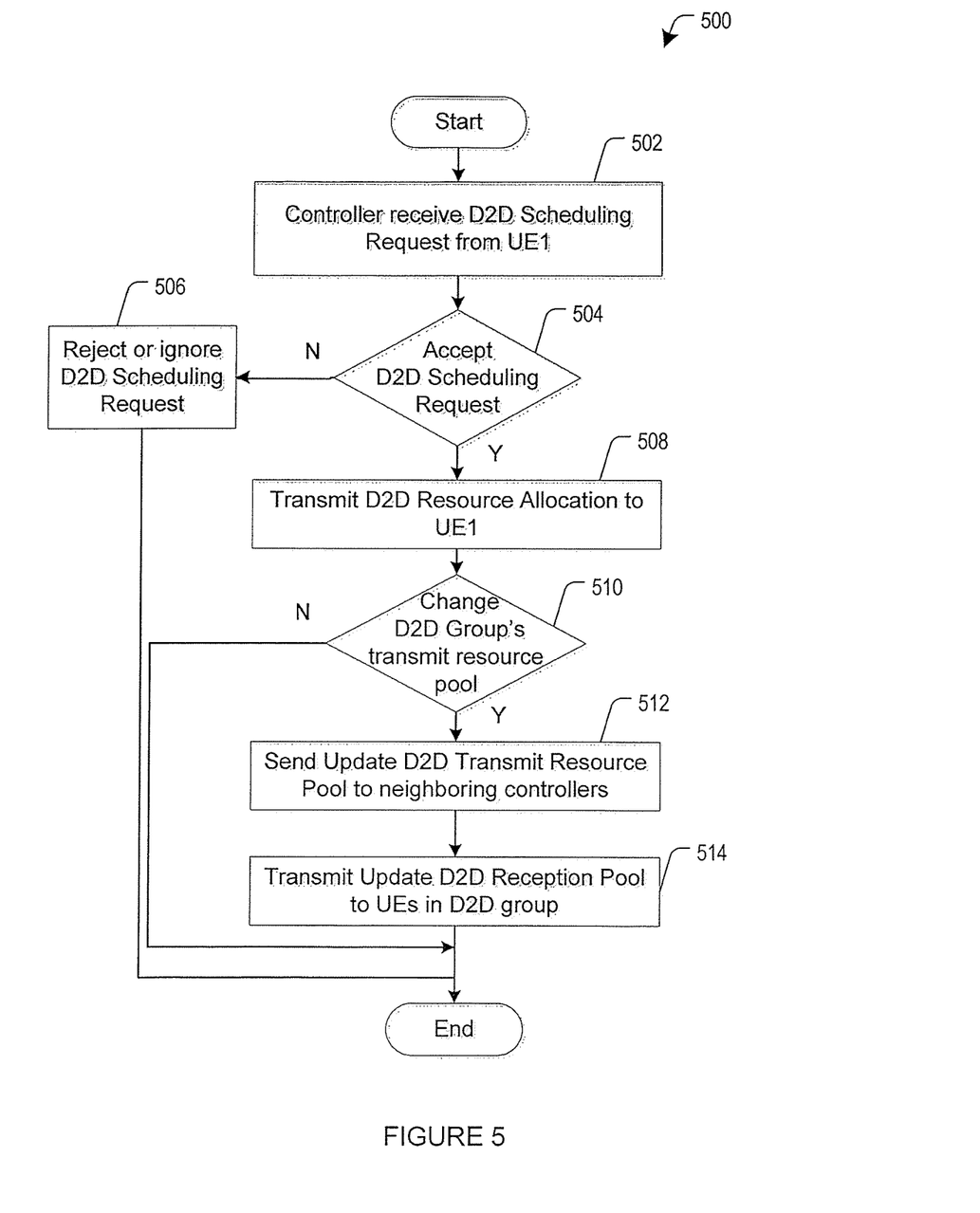
FIG. 5 illustrates an example method for operations occurring in a serving controller as the serving controller participates in device-to-device communication resource allocation according to one embodiment.

FIG. 5 illustrates an example method 500 for operations occurring in a serving controller or base station as the serving controller participates in device-to-device communication resource allocation according to one embodiment. For ease of explanation, the method 500 is described as being used in connection with one or more components in FIGS. 1 through 4. Of course, the method 500 may be used in any other suitable device or system.

At step 502, a serving controller receives a device-to-device (D2D) scheduling request from an electronic device. For example, the first base station 170a receives a D2D scheduling request 410 from the first UE 110a.

At step 504, a determination is made whether to accept the D2D scheduling request. If the D2D scheduling request is rejected or ignored (step 506), then the method 500 ends.

If the D2D scheduling request is accepted, then at step 508, a D2D resource allocation is transmitted to the electronic device. For example, in response to receipt of the D2D scheduling request 410, the first base station 170a allocates D2D communications resources to the first UE 110a.

At step 510, a determination is made whether a change in a transmit resource pool of the D2D group is detected. If no change in the transmit resource pool is detected, then the method ends. If a change in the transmit resource pool is detected, then at step 512, an update D2D transmit resource pool message is sent to neighboring base stations. For example, in response to detecting a change in the transmit resource pool at step 430, the first base station 170a sends an update D2D transmit resource pool message 440 to the second base station 170b.

At step 514, an update D2D reception pool message is sent to electronic devices in the D2D group. For example, the first base station 170a sends an update D2D reception pool message to the first UE 110a.

Although FIG. 5 illustrates one example of a method 500 for operations occurring in a serving controller as the serving controller participates in device-to-device communication resource allocation, various changes may be made to FIG. 5. For example, while shown as a series of steps, various steps in FIG. 5 could overlap, occur in parallel, occur in a different order, or occur any number of times.

Figure 6:
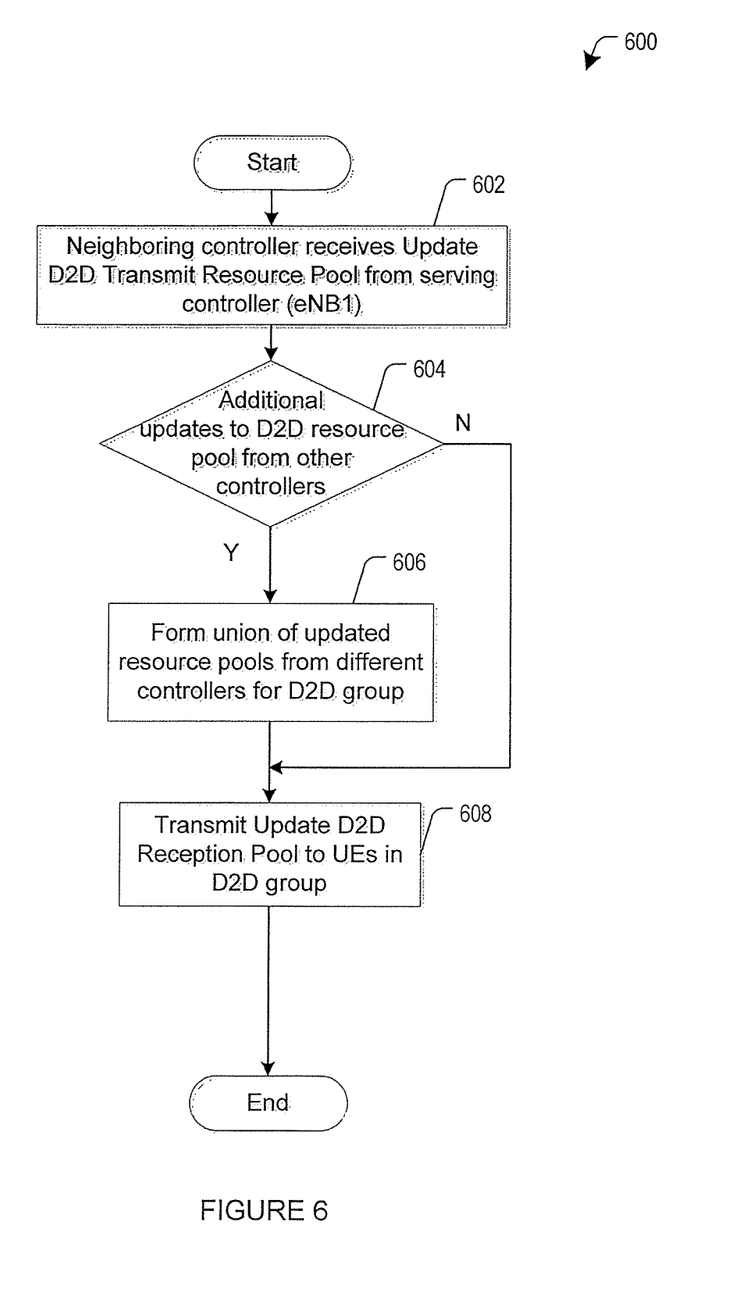
FIG. 6 illustrates an example method for operations occurring in a neighboring controller as the neighboring controller participates in device-to-device communication resource allocation according to one embodiment.

FIG. 6 illustrates an example method 600 for operations occurring in a neighboring controller or base station as the neighboring controller participates in device-to-device communication resource allocation according to one embodiment. For ease of explanation, the method 600 is described as being used in connection with one or more components in FIGS. 1 through 5. Of course, the method 600 may be used in any other suitable device or system.

At step 602, a neighboring controller receives an update D2D transmit resource pool message from a serving controller. For example, the second base station 170b receives the update D2D transmit resource pool message 440 from the first base station 170a.

At step 604, a determination is made whether additional updates to the D2D resource pool are received from other controllers. If additional updates to the D2D resource pool are not received from other controllers, then at step 608, an update D2D reception pool message is transmitted to electronic devices in the D2D group. For example, the second base station 170b sends an update D2D reception pool message 450 that contains the updated resource pool information to the UEs that it serves that are in the D2D communication group (e.g., the second UE 110c).

If additional updates to the D2D resource pool are received from other controllers, then at step 606, a union of updated resource pools from the other controllers is formed, and at step 608, an update D2D reception pool message is transmitted to electronic devices in the D2D group. For example, the second base station 170b may receive an updated D2D transmit resource pool message from a third base station that controls a third UE in the communication group in response to the third base station detecting a change in a transmit resource pool, and the second base station 170b may send an update D2D reception pool message 450 that contains the updated resource pool information from both the first base station 170a and the third base station to the UEs that it serves that are in the D2D communication group (e.g., the second UE 110c).

Although FIG. 6 illustrates one example of a method 600 for operations occurring in a neighboring controller as the neighboring controller participates in device-to-device communication resource allocation, various changes may be made to FIG. 6. For example, while shown as a series of steps, various steps in FIG. 6 could overlap, occur in parallel, occur in a different order, or occur any number of times.

Figure 7:
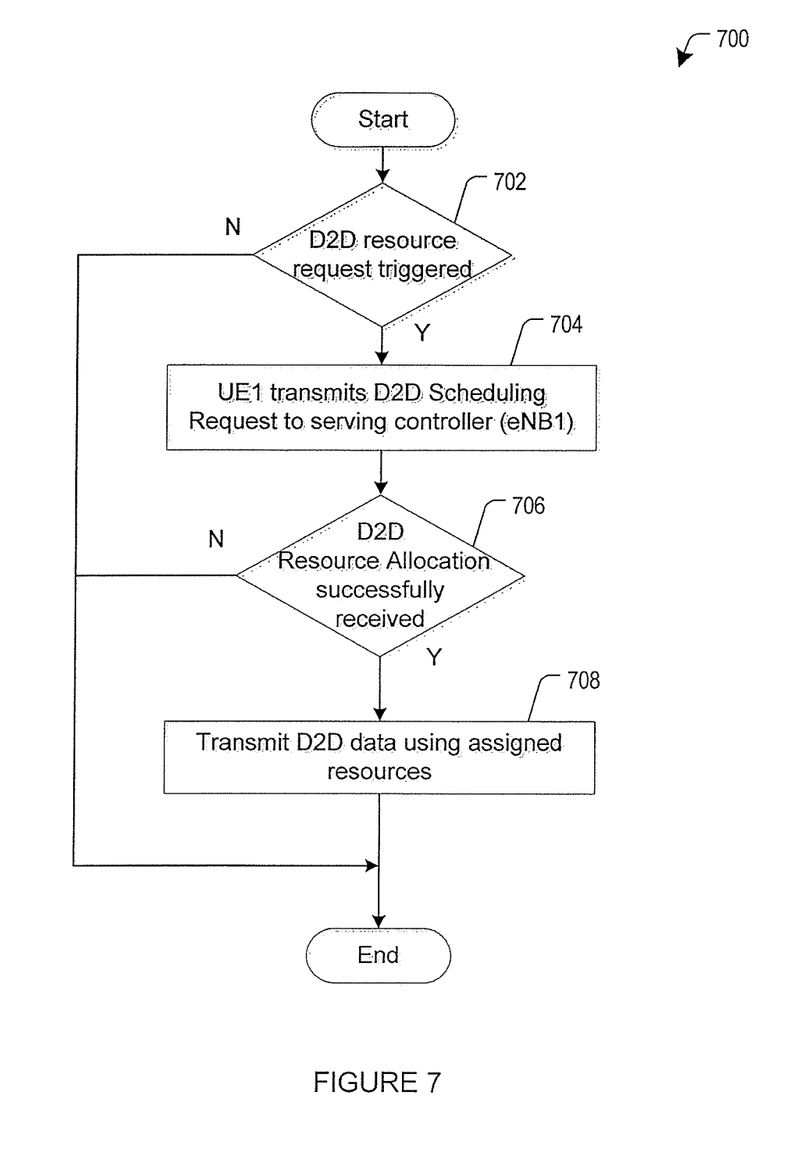
FIG. 7 illustrates an example method for operations occurring in a transmitting electronic device as the transmitting electronic device participates in device-to-device communication resource allocation according to one embodiment.

FIG. 7 illustrates an example method 700 for operations occurring in a transmitting electronic device as the transmitting electronic device participates in device-to-device communication resource allocation according to one embodiment. For ease of explanation, the method 700 is described as being used in connection with one or more components in FIGS. 1 through 6. Of course, the method 700 may be used in any other suitable device or system.

At step 702, a determination is made whether a device-to-device (D2D) resource request has been triggered. If a D2D resource request has not been triggered, the method ends.

If a D2D resource request has been triggered, then at step 704, the electronic device transmits a D2D scheduling request to the serving controller. For example, the first UE 110a transmits the D2D scheduling request 410 to the first base station 170a.

At step 706, a determination is made whether a D2D resource allocation has been successfully received. For example, the first UE 110a receives the D2D resource allocation information 420 from the first base station 170a and determines whether the D2D resource allocation information 420 has been successfully received. If the D2D resource allocation information 420 has not been successfully received, the method ends.

If the D2D resource allocation information 420 has been successfully received, then at step 708, D2D data is transmitted using the assigned resources. For example, the first UE 110a transmits D2D data 460 to the second UE 110c.

Although FIG. 7 illustrates one example of a method 700 for operations occurring in a transmitting electronic device as the transmitting electronic device participates in device-to-device communication resource allocation, various changes may be made to FIG. 7. For example, while shown as a series of steps, various steps in FIG. 7 could overlap, occur in parallel, occur in a different order, or occur any number of times.

Figure 8:
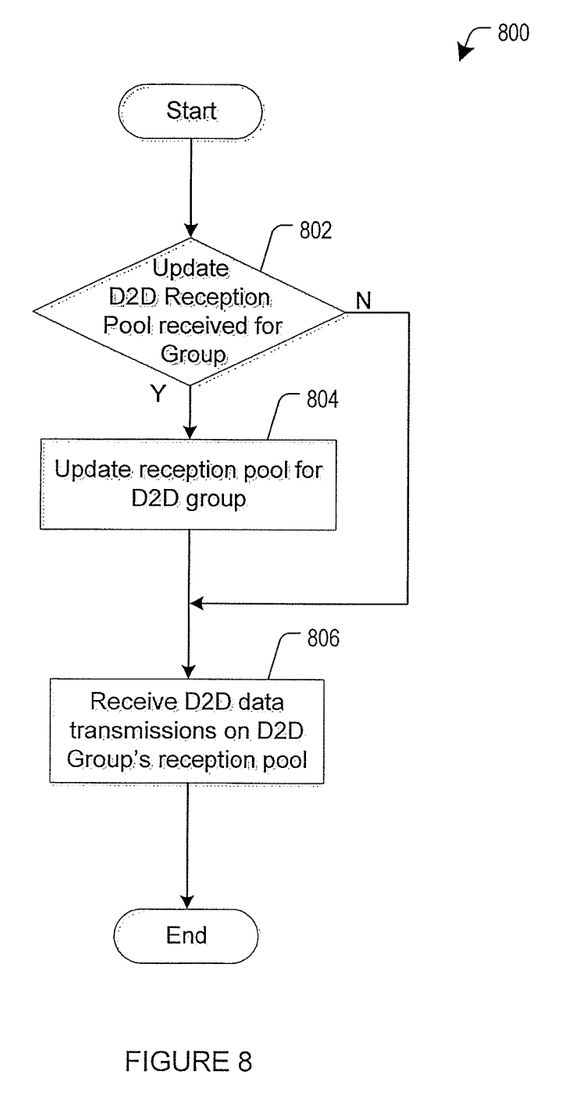
FIG. 8 illustrates an example method for operations occurring in a receiving electronic device as the receiving electronic device participates in device-to-device communication resource allocation according to one embodiment.

FIG. 8 illustrates an example method 800 for operations occurring in a receiving electronic device as the receiving electronic device participates in device-to-device communication resource allocation according to one embodiment. For ease of explanation, the method 800 is described as being used in connection with one or more components in FIGS. 1 through 7. Of course, the method 800 may be used in any other suitable device or system.

At step 802, a determination is made whether an update device-to-device (D2D) reception pool message has been received for the D2D communication group. If an update D2D reception message has not been received, then at step 806, D2D data transmissions are received on the D2D communication group's reception pool. If an update D2D reception message has been received, then at step 804, the reception pool for the D2D communication group is updated, and at step 806, the D2D data transmissions are received on the D2D communication group's "updated" reception pool. For example, the second UE 110c determines whether the update D2D resource pool message 450 has been received. If the update D2D resource pool message 450 has not been received, the second UE 110c receives the D2D data transmissions on the D2D communication group's reception pool. If the update D2D resource pool message 450 has been received, the second UE 110c updates the reception pool for the D2D communication group and receives the D2D data transmissions on the D2D communication group's updated reception pool.

Although FIG. 8 illustrates one example of a method 800 for operations occurring in a receiving electronic device as the receiving electronic device participates in device-to-device communication resource allocation, various changes may be made to FIG. 8. For example, while shown as a series of steps, various steps in FIG. 8 could overlap, occur in parallel, occur in a different order, or occur any number of times.

One benefit of the present disclosure includes a method and system for wireless controllers to communicate D2D radio resources allocated to members of a communication group to other controllers controlling devices in the same communication group. Another benefit includes a method and system for a wireless controller to form a receiver resource pool for a D2D communication group as the union of D2D communication resources allocated to members of that group, by itself or other wireless controllers. Yet another benefit includes a method to control and minimize interference between D2D devices by coordinating the D2D communication resource assignments between wireless controllers. Yet another benefit is that the inter-cell coordination for a D2D communication resource allocation minimizes processing consumption and minimizes power consumption for communication devices engaged in D2D group communications.

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   receiving, by a second base station, information corresponding to a device-to-device (D2D) communication resource allocation from a first pool of D2D communication resources to a first electronic device controlled by a first base station, wherein the first pool of D2D communication resources is reserved for D2D communication within a D2D communication group that includes the first electronic device, a second electronic device, and a third electronic device, and each electronic device of the D2D communication group communicates with each of the other electronic devices of the D2D communication group using the first pool of D2D communication resources;
   receiving, by the second base station, information indicating a change to the first pool of D2D communication resources for the D2D communication group from the first base station;
   transmitting, by the second base station, information corresponding to the changed first pool of D2D communication resources to the second electronic device in response to receiving the information indicating the change to the first pool of D2D communication resources from the first base station;
   receiving, by the second base station, information indicating a change to a second pool of D2D communication resources from a third base station that controls the third electronic device within the D2D communication group; and
   transmitting, by the second base station, information corresponding to the changed second pool of D2D communication resources to the second electronic device.

2. The method in accordance with claim 1, wherein the information corresponding to the changed first pool of D2D communication resources and the information corresponding to the changed second pool of D2D communication resources is combined prior to transmission to the second electronic device.

3. The method in accordance with claim 1, further comprising:
   transmitting, by the second base station, the information corresponding to the changed first pool of D2D communication resources to the first base station.

4. A second base station comprising:
   a processor; and
   a non-transitory computer readable storage medium storing programming for execution by the processor, the programming including instructions to:
      receive information corresponding to a device-to-device (D2D) communication resource allocation from a first pool of D2D communication resources to a first electronic device controlled by a first base station, wherein the first pool of D2D communication resources is reserved for D2D communication within a D2D communication group that includes the first electronic device, a second electronic device, and a third electronic device, and each electronic device of the D2D communication group communicates with each of the other electronic devices of the D2D communication group using the first pool of D2D communication resources;
      receive information indicating a change to the first pool of D2D communication resources for the D2D communication group from the first base station;
      transmit information corresponding to the changed first pool of D2D communication resources to the second electronic device in response to receiving the information indicating the change to the first pool of D2D communication resources from the first base station;
      receive information indicating a change to a second pool of D2D communication resources from a third base station that controls the third electronic device within the D2D communication group; and
      transmit information corresponding to the changed second pool of D2D communication resources to the second electronic device.

5. The second base station of claim 4, wherein the information corresponding to the changed first pool of D2D communication resources and the information corresponding to the changed second pool of D2D communication resources is combined prior to transmission to the second electronic device.

6. The second base station of claim 4, wherein the programming further includes instructions to:
   transmit the information corresponding to the changed first pool of D2D communication resources to the first base station.

* * * * *